US012574445B2

(12) United States Patent
Rodrigues et al.

(10) Patent No.: US 12,574,445 B2
(45) Date of Patent: Mar. 10, 2026

(54) INTERACTIVE CLIENT NOTIFICATIONS

(71) Applicant: Bank of America Corporation,
Charlotte, NC (US)

(72) Inventors: Michelle Rodrigues, Jersey City, NJ
(US); Sivakumar Nagarajan, Plano,
TX (US); John T. Blackmon,
Jacksonville, FL (US); **Ryan W.
Barnes, Chandler, AZ (US); Babu
Kannan**, Pennington, NJ (US);
Saravana Prakash Kumaresan,
Plainsboro, NJ (US); Tai Nguyen,
Plano, TX (US); Carla M. Jans,
Charlotte, NC (US); **Lauren E.
Schuler**, Waltham, MA (US)

(73) Assignee: Bank of America Corporation,
Charlotte, NC (US)

( * ) Notice: Subject to any disclaimer, the term of this
patent is extended or adjusted under 35
U.S.C. 154(b) by 145 days.

(21) Appl. No.: 18/433,585

(22) Filed: Feb. 6, 2024

(65) Prior Publication Data

US 2025/0254225 A1     Aug. 7, 2025

(51) Int. Cl.
*H04L 67/55*          (2022.01)
*G06F 3/0482*         (2013.01)
*H04W 68/00*          (2009.01)

(52) U.S. Cl.
CPC ............ *H04L 67/55* (2022.05); *G06F 3/0482*
(2013.01); *H04W 68/005* (2013.01)

(58) Field of Classification Search
CPC .... H04L 67/55; G06F 3/0482; H04W 68/005;
H04W 68/00; H04W 65/00; H04M
1/2749; H04M 1/663; H04M 1/7243;
H04M 1/72469
See application file for complete search history.

(56) References Cited

U.S. PATENT DOCUMENTS

| | | | |
|---|---|---|---|
| 2015/0127396 A1* | 5/2015 | Sheldon ........... | G06Q 10/06311 |
| | | | 705/7.13 |
| 2018/0032997 A1* | 2/2018 | Gordon .............. | G06Q 30/0269 |
| 2018/0063329 A1* | 3/2018 | Mitchell .............. | H04L 51/214 |
| 2018/0309801 A1* | 10/2018 | Rathod ............... | H04M 3/5175 |
| 2019/0124196 A1* | 4/2019 | Vendrow .............. | H04M 3/564 |
| 2023/0283714 A1* | 9/2023 | Frendo .............. | H04M 3/42042 |
| | | | 379/265.09 |

* cited by examiner

*Primary Examiner* — Schquita D Goodwin
*Assistant Examiner* — Mehulkumar J Shah
(74) *Attorney, Agent, or Firm* — Weiss & Arons LLP

(57) ABSTRACT

A system for utilizing push alert notifications resident in an
auto-dialer is provided. The auto-dialer may include a noti-
fication/dialing list of push alert notification recipients, an
outbound orchestrator utility for receiving a list of the
recipients, and a notification service utility. The outbound
orchestrator utility may initiate a push alert notification for
a member including instructions to send the push alert
notification to the notification service utility, and displaying
an actionable viewing screen that prompts the member to
accept the scheduled time or to schedule a different time.
When accepted, a selection is received that accepts the
scheduled time for the future call and transmits a confirma-
tion instruction to execute the scheduled call. When the
selection declines the scheduled time for the call and re-
schedules a new time for the future call, the instructions
transmit an instruction to the auto-dialer to execute the
future telephone call at the new time.

16 Claims, 5 Drawing Sheets

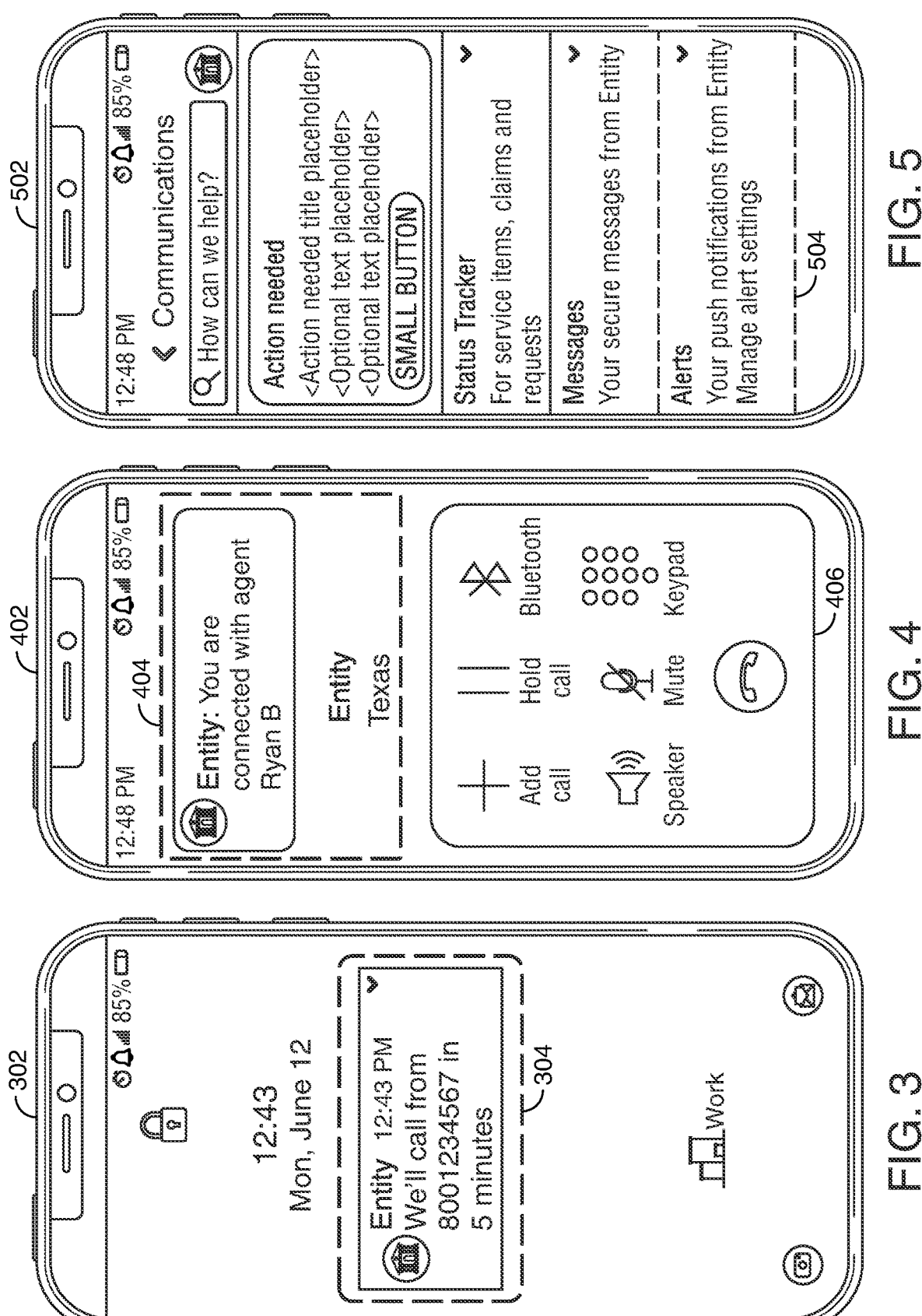

Communications

How can we help?

Action needed
<Action needed title placeholder>
<Optional text placeholder>
<Optional text placeholder>
SMALL BUTTON Status Tracker
For service items, claims and requests Messages
Your secure messages from Entity Alerts
Your push notifications from Entity
Manage alert settings

504

402

12:48 PM    85%

404

Entity: You are connected with agent Ryan B

Entity
Texas

Add call

Hold call

Bluetooth

Speaker

Mute

Keypad

406

302

85%

12:43
Mon, June 12

Entity 12:43 PM
We'll call from 8001234567 in 5 minutes

304

Work

INTERACTIVE CLIENT NOTIFICATIONS

FIELD OF TECHNOLOGY

Aspects of the disclosure relate to client notifications.

BACKGROUND OF THE DISCLOSURE

The general public is typically hesitant to answer unsolicited calls. This is true even when it becomes clear that the unsolicited calls are generated by an entity that currently is in a business relationship with the member of the general public.

The reason that the general public is hesitant to answer unsolicited calls is at least because people mistrust unsolicited callers.

Such a hesitancy precludes entities from contacting clients of the entities, even for the needs and/or the benefit of the client.

As such, it would be desirable to provide systems and methods that reduce the hesitancy of clients to respond to entity-generated, yet unsolicited, electronic interactions.

It would be further desirable to provide systems and methods that enable the client to efficiently input the client's preference for scheduling the interaction.

SUMMARY OF THE DISCLOSURE

Surveys have shown that push alerts for entity-initiated, unsolicited, phone calls would significantly increase client confidence and response percentages. For the purposes of this application, the term "push alerts" refers to unilaterally generated electronic messaging from a first entity to a second entity.

Such push alerts increase client confidence and have been statistically shown to improve call answer rate by client responders.

A method for utilizing push alert notifications is provided. The method may include receiving, at an outbound orchestrator utility, a notification/dialing list of push alert notification recipients. The method may further include initiating, at the outbound orchestrator utility, a push alert notification for one or more members of the list of push alert recipients.

The initiating may include transmitting instructions for the push alert notification to a notification service utility. The instructions for transmitting the push alert notification may include a pre-determined amount of time prior to execution of a future automated call. The push alert notification may include a scheduled time for the future automated call.

The method may further include presenting an actionable display screen that prompts the member of the list of push alert recipients to either accept the scheduled time for the future telephone call or to schedule a different time for the future telephone call execution.

Finally, the method may include receiving a selection from the member of the list of push alert recipients that accepts the scheduled time for the future telephone call and transmitting a confirmation instruction to the auto-dialer to automatically execute the future telephone call at the scheduled time. Alternately, the method may include receiving a selection from the member of the list of push alert recipients that declines the scheduled time for the future telephone call and accepts the offered time or otherwise re-schedules a new time for the future telephone conference. Then the method may include transmitting a confirmation instruction to the auto-dialer to automatically execute the future telephone call at the new time.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows a first schematic diagram of a mobile device in accordance with the disclosure;

FIG. 4 shows a first schematic diagram of a mobile device in accordance with the disclosure;

FIG. 5 shows a first schematic diagram of a mobile device in accordance with the disclosure;

DETAILED DESCRIPTION OF THE DISCLOSURE

Figure 1:
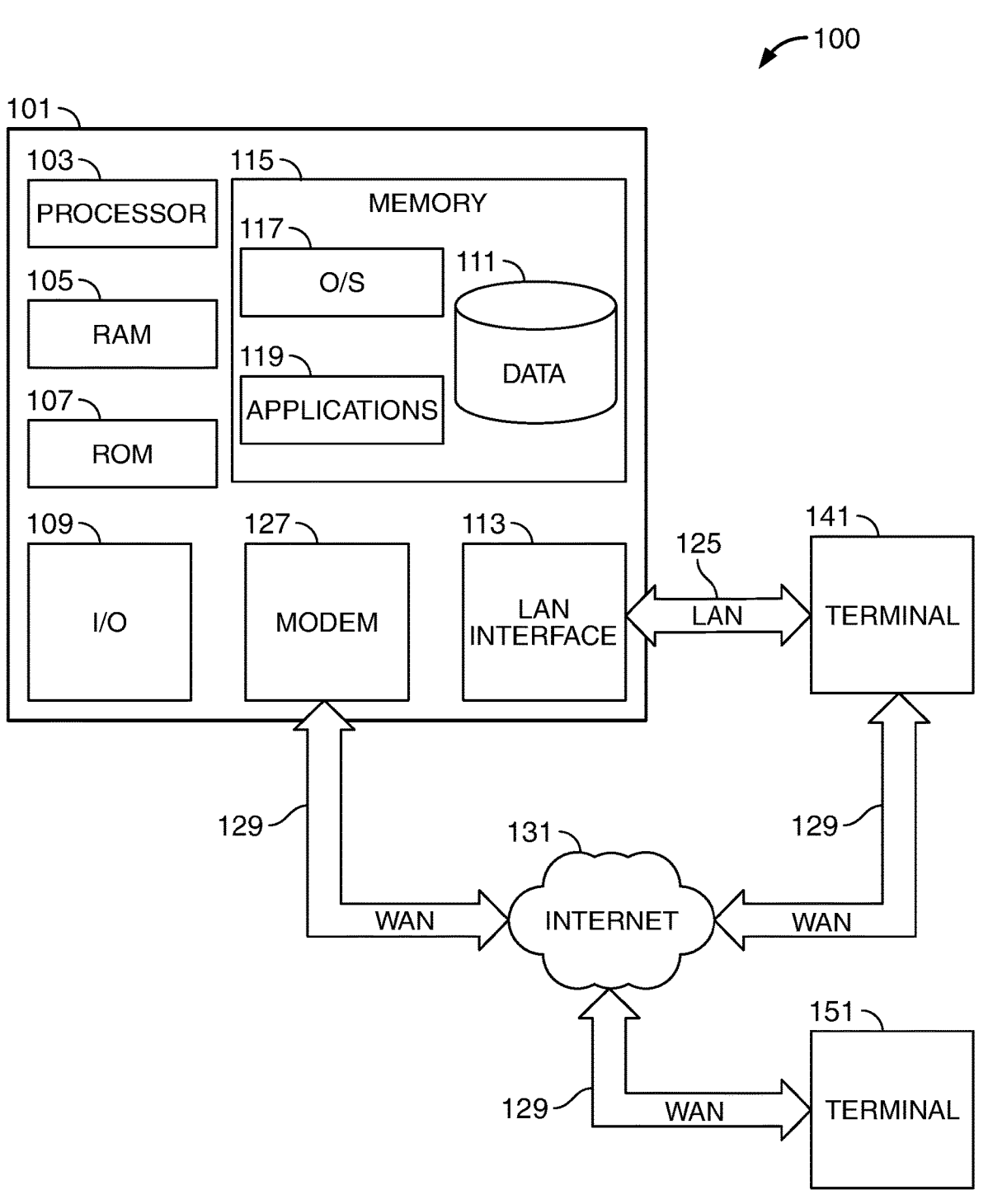
FIG. 1 shows an illustrative diagram in accordance with principles of the disclosure.

Systems and methods according to the current disclosure enable customers to interact with an entity with confidence. Such interactions preferably reduce risk of imposters while increasing client response rates.

Target solutions, according to the embodiments, may preferably involve delivering a mobile application ("app") push alert prior to initiating a client call. A target solution, according to the embodiments, may also involve a follow-up push alert when the client is connected with the entity via the client call.

Use cases, according to the embodiments, may apply to applications of fraud alert communications, collection, other emergent follow-up communications, document transmission follow-up communications, communication returns, abandoned calls and any other suitable communications. For example, when a client plans on making a scheduled inbound call to the entity, or a specific number within the entity, the entity may send a push alert as a reminder for the client to either call in at the expected time or to reschedule.

Certain embodiments may involve use cases directed to unsolicited outbound communications to clients. Some embodiments may involve use cases involving increasing security and trust for inbound communications.

In certain embodiments, digital notification via push alert through online transaction support may also promote more secure messaging.

Advantages of the current embodiments may include potentially decreasing losses attributable to security breaches and reductions in inbound and/or outbound call volumes.

High client confidence results, achieved through the embodiments set forth herein, can obtain high-quality relationships and responsible growth.

Furthermore, such embodiments can help an entity emerge as a leader, instilling client confidence. Such client confidence can affect how clients transact with a pre-determined entity.

Methods for utilizing push alert notifications are provided. Such methods may include receiving, at an outbound orchestrator utility, a notification/dialing list of push alert notification recipients. It should be noted that such a utility may be understood to include a computer having the ability to process incoming and outgoing communications in accordance with certain rules and/or scheduling constraints.

The methods may further include initiating, at the outbound orchestrator utility, a push alert notification for a member of the list of push alert recipients. For the purposes of this patent application, a push alert notification may be understood to include an electronic message for notifying a recipient regarding the validity of impending or current communications. Such initiating may include transmitting instructions for the push alert notification to a notification service utility. Such instructions may be for transmitting the push alert notification at a pre-determined amount of time prior to execution of an automated call. Such a pre-determined amount of time may be calculated using artificial intelligence. For example, a user's communication history may be reviewed prior to pre-determined opportune amounts of time at which to alert the user using a push alert notification. Based on the user communication history, the system may determine an opportune time to inform the user of the upcoming communications. In some embodiments, such push alert notification may include a scheduled time for a future telephone call.

Methods, according to the current disclosure, may also include electronically presenting an actionable display screen to a user. Such a display screen may prompt the member of the list of push alert recipients to either not respond, confirm receipt of the push alert notification, accept the scheduled time for the future telephone call and/or to schedule a different time for the future telephone call execution.

The methods, according to the current disclosure, may also include receiving a selection from the member of the list of push alert recipients that accepts the scheduled time for the future telephone call and transmits a confirmation instruction to the auto-dialer to automatically execute the future telephone call at the scheduled time. In some use cases, the methods may include timing-out after a pre-determined amount of time prior to transmitting the push alert notification. Such a timing-out may signify that the user has tacitly agreed to accepting the upcoming communication.

Alternatively, the methods may include receiving a selection from the member of the list of push alert recipients that declines the scheduled time for the future telephone call and re-schedules a new time for the future telephone conference and transmitting a confirmation instruction to the auto-dialer to automatically execute the future telephone call at the new time.

In some embodiments, the push alert notification further includes an initiating number for the future telephone call. The actionable display screen that appears on the user's preferably mobile device may also include numerous selectable options for selection by the recipient. Each of the plurality of selectable options may preferably include a request for a unique time for the occurrence of the future telephone call.

The actionable display screen may also include a plurality of selectable options for selection by the recipient. Each of said plurality of selectable options specifies a discreet and different time window for the occurrence of the future telephone call.

The notification/dialing list of push alert notification recipients may be received from an application programming interface ("API") feed. In certain embodiments, the notification/dialing list of push alert notification recipients may include a manually entered number received via a software telephone service ("SPWS").

Upon transmitting a confirmation instruction to the auto-dialer to automatically execute the telephone call at the scheduled time (or recipient-requested) time, the methods may further include updating the future telephone call to a "ready-for-outbound" call status.

Upon transmitting a confirmation instruction to the auto-dialer to automatically execute the telephone call at the time newly-selected by the user, the methods may include updating the future telephone call to a ready-for-outbound call status.

It should be noted that when a user selects one of the prompts, and, thereby, indicates the user's willingness to elect a certain time for the impending communication, this user selection may preferably be added to an AI model for later in time use with further AI decision-making.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented termination program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an artificial intelligence implemented termination program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more artificial intelligence ("AI")/Machine Learning ("ML") algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
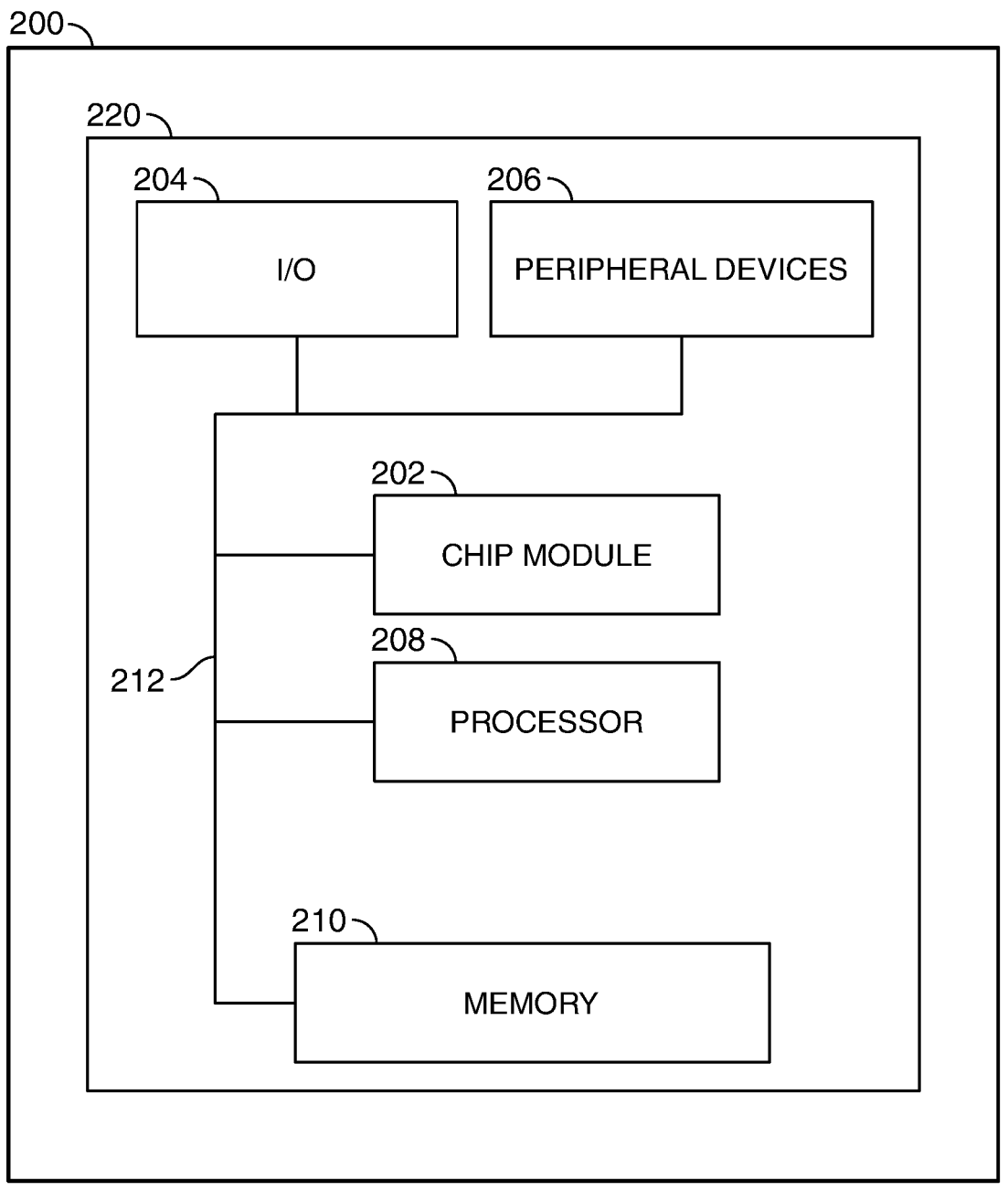
FIG. 2 shows another illustrative diagram in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-9. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

FIG. 3 shows a schematic diagram of a mobile device 302 according to the embodiments. Mobile device 302 shows an exemplary push alert 304. Push alert 304 is displayed, following transmission by an entity to a client. Push alert preferably indicates an alert arrival time—i.e., "12:43 PM", and a scheduled communications time—i.e., "in five minutes".

FIG. 4 shows another schematic diagram of a mobile device 402 according to the embodiments. At 404, a push alert 404 is shown in mobile device 402. It should be noticed that push alert 402, as well as ongoing call display 406, generally indicates that the push alert shown in FIG. 4 involves an ongoing call. Such an in-call push alert 404 may preferably increase security as well as lift confidence of a user of the system at least because the client is reassured that the ongoing communication is supported by the entity.

FIG. 5 shows yet another a schematic diagram of a mobile device 502 according to the embodiments. Mobile device 502 shows a general listing of communications-related utilities. At 504, an "alerts" utility 504 is shown. Alerts utility 504 shows a location wherein a client can review, and possibly act on, respond to, or comment on, historical alert activity.

Figure 6:
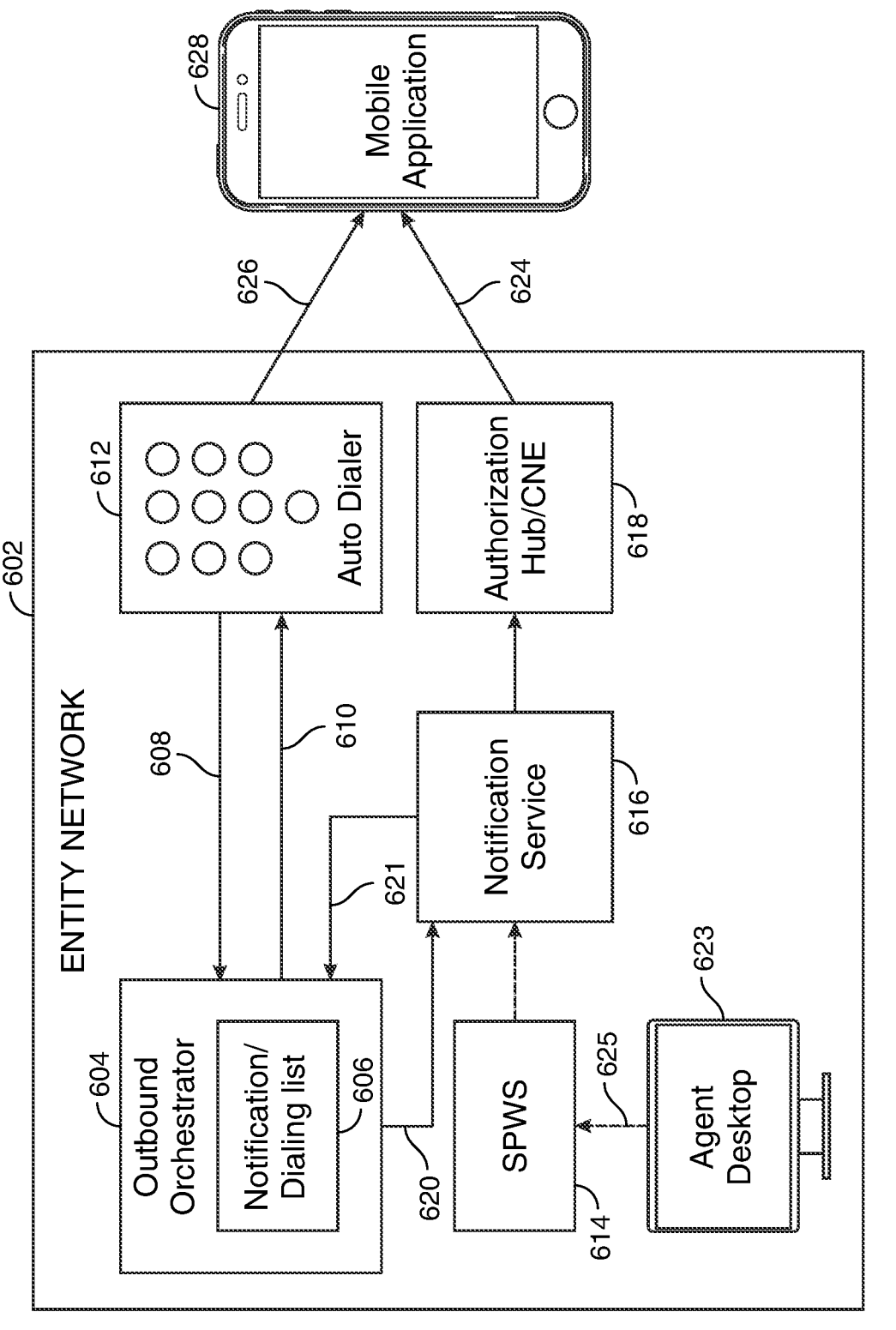
FIG. 6 shows a first hybrid system/flow diagram in accordance with aspects of the disclosure.

FIG. 6 shows an architecture 602 of a computing system for use with systems and methods that communicate with mobile device 628 according to the disclosure. Architecture 602 preferably includes an outbound orchestrator 604

(which itself includes a notification/client dial list), an auto dialer 612, a softphone web service (SPWS) 614, a notification service 616, an auth(orization) hub/client notification engine ("CNE") 618 and an agent desktop 620.

At 608, auto dialer 612 may preferably send a notification list to outbound orchestrator 604. At 602, outbound orchestrator 604 may preferably transmit an initiate notification instruction (prior to initiating an auto-call) to notification service 616. In response to receipt of notification instruction via the initiate notification instruction rail 620, notification service 616 may preferably instruct at 620 auth-hub/CNE 618 to utilize the CNE to send a push alert notification (at a pre-determined time prior to call), at the communications rail at 624, to the client mobile device 628. It should be noted that once an initiate notification instruction has been sent initial notification rail 620, and notification service may confirm same to outbound orchestrator via communication rail 621.

Push alert notification 624 may preferably indicate an approximate, or exact, timeframe within which the entity will be calling client mobile device 628. Furthermore, push alert notification 624 may preferably indicate a telephone number from which the client can expect to receive the expected phone call from the entity.

Within the approximate, or exact, time frame, auto-dialer 612 preferably executes a call to mobile application 628, as shown at 626. It should be noted that, although auto dialer 612 preferably executes the call in an automated fashion—e.g., based on a list of pre-determined numbers, a manually input number is also possible and within the scope of the invention. To that end, agent desktop 623 is shown. Agent desktop 623 may preferably invoke SPWS indicate a telephone number. The telephone number may be used as a target to which to initiate a push alert notification via notification service 616.

Once SPWS has been used to initiate a push alert notification via notification service 616, then via notification rail 621. Whether in response to a manually entered phone number, or an auto-listed number, once the push alert notification has been sent via communication rail 621 it may be placed in line for a follow-up call using rail 610 to auto-dialer 612. It should be noted that, in certain embodiments, the follow-up calls using rail 610 and auto-dialer 612 may iteratively run through the list of scheduled calls until the currently scheduled calls are exhausted. Further, based on the notification delivery confirmations sent by notification service 616, the list may be continuously updated with "ready for outbound call" status and then sent to auto-dialer as needed. Preferably, retry attempts can be configured, using AI, based on the use case.

According to the foregoing embodiments, the system is preferably providing an efficient system for bootstrapping communication rails for multiple purposes, while supporting efficient and timely communications.

Once a user receives a push alert notification, the user may be provided with a utility with which the user can indicate willingness or unwillingness to accept the future phone call. Furthermore, the user can specify that the user wishes to accept the future call at the time set forth in the push alert notification. The user recipient may elect to decline some aspect of the push alert.

Figure 7:
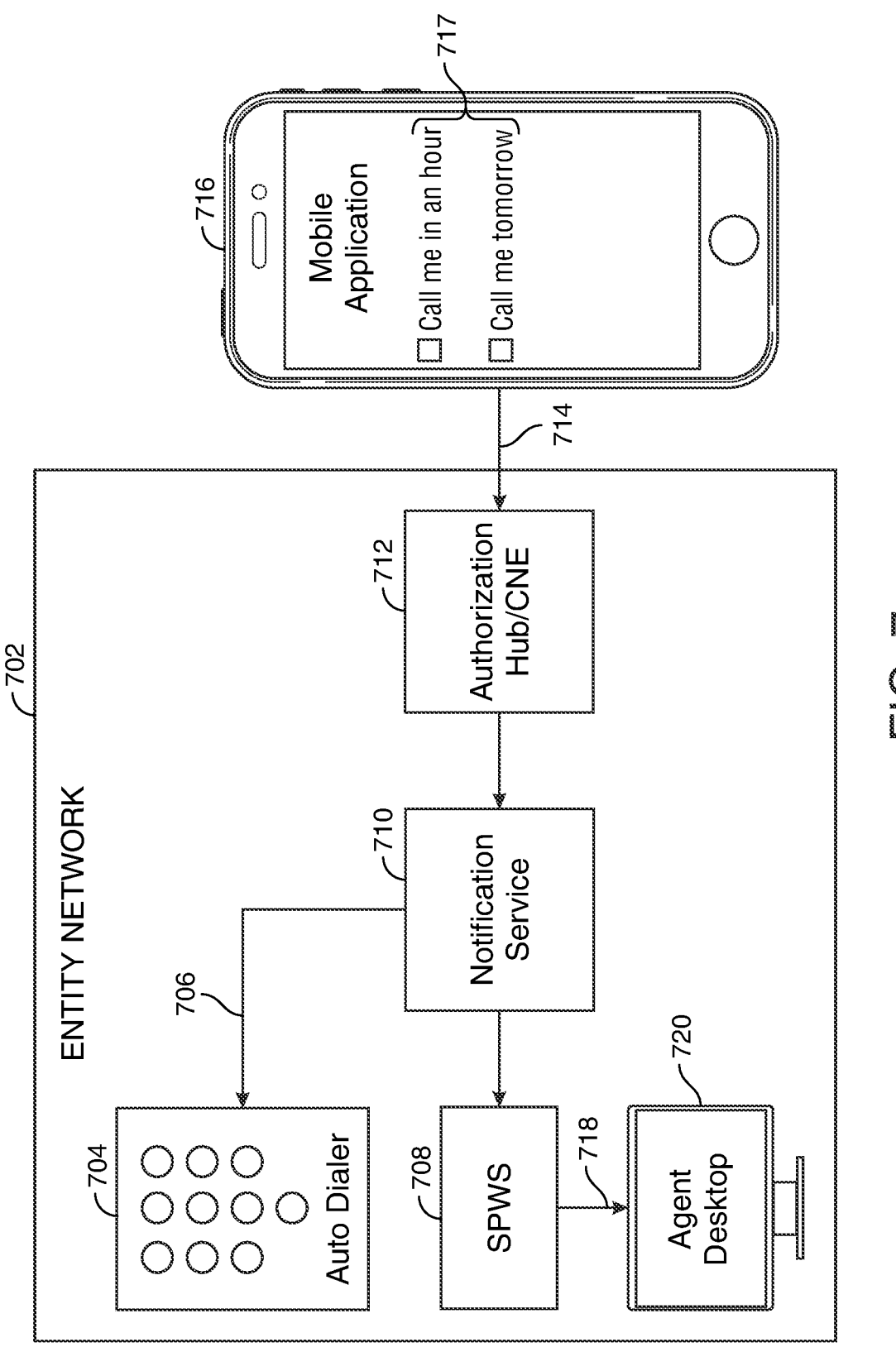
FIG. 7 shows a second hybrid system/flow diagram in accordance with aspects of the disclosure.

FIG. 7 shows a return path of a response to a push alert notification. Along rail 714, a mobile application resident on mobile device 716 may be configured to enable a user to respond to the push alert notification. Such a response may include delaying a call associated with a push alert notification. Such a response may include a refusal of such push alert notification—or an opt-out from future similar calls. Such a response may include an indication of affinity for such calls. Such a response may include a lack of affinity—i.e., a showing of dislike—for such calls. Such responses, whether exhibiting positive or negative sentiment, may be added to an AI model and may be used to inform future communication instructions.

In some cases, a menu may offer the user options to delay, or otherwise act on such a call. These options are shown at 717 and may include such options as "call me in an hour" or "call me tomorrow."

The responses may preferably be transmitted to entity network 702 at auth(orization) hub/client notification engine ("CNE") 712 along rail 714. Auth-hub/CNE 712 may preferably relay the response to notification service 710 for further transmission.

Along a first branch, notification service 710 may message, along rail 706, auto-dialer 704 to revise the position in a dialing queue of the responding user to coincide with the scheduling selected by the responding user.

Along a second branch, notification service 710 may message SPWS to contact agent desktop 720 along rail 718. Such a contact may include an alert to an agent associated with agent desktop 720 in order to let the agent know that there has been an adjustment to the queue—vis-à-vis a requested or automated push alert notification.

Thus, systems and methods for interactive client notifications are provided. Persons skilled in the art will appreciate that the present invention can be practiced by other than the described embodiments, which are presented for purposes of illustration rather than of limitation. The present invention is limited only by the claims that follow.

What is claimed is:

1. A method for utilizing push alert notifications of a computing system comprising an outbound orchestrator utility and a push alert notification to a notification service utility, said method comprising, said method comprising:
   receiving, at the outbound orchestrator utility, a notification/dialing list of push alert notification recipients;
   initiating, at the outbound orchestrator utility, the push alert notification for a member of the list of push alert recipients, said initiating comprising transmitting instructions for the push alert notification to the notification service utility, said instructions for transmitting the push alert notification at a pre-determined amount of time prior to execution of a future automated call, said push alert notification comprising a scheduled time for the future automated call;
   presenting an actionable display screen that prompts the member of the list of push alert recipients to either accept the scheduled time for the future automated call or to schedule a different time for an execution of the future automated call; and
   receiving a selection from the member of the list of push alert recipients that accepts the scheduled time for the future automated call and transmitting a confirmation instruction to an auto-dialer to automatically execute the future automated call at the scheduled time or receiving a selection from the member of the list of push alert recipients that declines the scheduled time for the future automated call and re-schedules a new time for the future automated call and transmitting a confirmation instruction to the auto-dialer to automatically execute the future automated call at the new times;

wherein the notification/dialing list of push alert notification recipients is received from an application programming interface ("API") feed; and
   wherein the notification/dialing list of push alert notification recipients includes a manually entered number received via a software telephone service ("SPWS").

2. The method of claim 1, wherein said push alert notification further comprises an initiating number for the future automated call.

3. The method of claim 1, wherein the actionable display screen further comprises a plurality of selectable options for selection by the recipient, each of said plurality of selectable options that specifies a unique different time for an occurrence of the future automated call.

4. The method of claim 1, wherein the actionable display screen further comprises a plurality of selectable options for selection by the recipient, each of said plurality of selectable options that specifies a discreet and different time window for an occurrence of the future automated call.

5. The method of claim 1, further comprising, upon transmitting a confirmation instruction to the auto-dialer to automatically execute the future automated call at the scheduled time, updating the future automated call to a ready for outbound call status.

6. The method of claim 1, further comprising, upon transmitting a confirmation instruction to the auto-dialer to automatically execute the future automated call at the new time, updating the future automated call to a ready for outbound call status.

7. The method of claim 1, wherein the future automated call is configured to display a push alert notification arrival time.

8. The method of claim 1, wherein said scheduled time comprises a window of time extending from a window initiation time to a window close time.

9. A system comprising one or more processors and memory configured for utilizing push alert notifications, said system comprising:
   an auto-dialer comprising a notification/dialing list of push alert notification recipients;
   an outbound orchestrator utility, said outbound orchestrator utility for receiving from the auto-dialer the notification/dialing list of push alert notification recipients;
   a notification service utility;
   wherein the outbound orchestrator utility is configured to initiate a push alert notification for a member of the list of push alert recipients, said initiating comprising transmitting instructions for the push alert notification to the notification service utility, said instructions for transmitting the push alert notification at a pre-determined amount of time prior to execution of a scheduled automated call, said push alert notification comprising a scheduled time for a scheduled automated call;
   wherein the instructions are further configured to display an actionable viewing screen that prompts the member of the list of push alert recipients to either accept the scheduled time for the scheduled automated call or to schedule a different time for an occurrence of a scheduled automated call execution; wherein, when the scheduled time for the scheduled automated time is accepted, the instructions are further configured for receiving a selection from the member of the list of push alert recipients, the selection that accepts the scheduled time for the scheduled automated call and transmits a confirmation instruction to the auto-dialer to automatically execute the scheduled automated call at the scheduled time; and wherein, when the selection from the member of the list of push alert recipients declines the scheduled time for the scheduled automated call and re-schedules a new time for the scheduled automated call and the instructions are further configured to transmit a confirmation instruction to the auto-dialer to automatically execute the scheduled automated call at the new time, wherein the notification/dialing list of push alert notification recipients is received from an application programming interface ("API") feed; and wherein the notification/dialing list of push alert notification recipients includes a manually entered number received via a software telephone service ("SPWS").

10. The system of claim 9, wherein said push alert notification further comprises an initiating number for the scheduled automated call.

11. The system of claim 9, wherein the actionable viewing screen further comprises a plurality of selectable options for selection by the recipient, each of said plurality of selectable options that specifies a unique different time for the occurrence of the scheduled automated call.

12. The system of claim 9, wherein the actionable display screen further comprises a plurality of selectable options for selection by the recipient, each of said plurality of selectable options that specifies a discreet and different time window for the occurrence of the scheduled automated call.

13. The system of claim 9, wherein, upon transmitting a confirmation instruction to the auto-dialer to automatically execute the scheduled automated call at the scheduled time, the instructions update the scheduled automated call to a ready for outbound call status.

14. The system of claim 9, wherein, upon transmitting a confirmation instruction to the auto-dialer to automatically execute the scheduled automated call at the new time, the instructions are further configured to update the scheduled automated call to a ready for outbound-call status.

15. The system of claim 9, wherein the push notification alert is configured to display a push alert notification arrival time.

16. The system of claim 9, wherein said scheduled time comprises a window of time extending from a window initiation time to a window close time.

\* \* \* \* \*